United States Patent
Rogoll et al.

(10) Patent No.: US 8,270,134 B2
(45) Date of Patent: Sep. 18, 2012

(54) ELECTRICAL CIRCUIT WITH INCENDIVE ARC PREVENTION

(75) Inventors: Gunther Rogoll, Mannheim (DE); Renato Kitchener, West Sussex (GB)

(73) Assignee: Pepperl & Fuchs (DE) (DE)

( * ) Notice: Subject to any disclaimer, the term of this patent is extended or adjusted under 35 U.S.C. 154(b) by 904 days.

(21) Appl. No.: 12/223,704

(22) PCT Filed: Feb. 5, 2007

(86) PCT No.: PCT/GB2007/000376
§ 371 (c)(1),
(2), (4) Date: Dec. 3, 2008

(87) PCT Pub. No.: WO2007/088387
PCT Pub. Date: Aug. 9, 2007

(65) Prior Publication Data
US 2009/0180226 A1 Jul. 16, 2009

(30) Foreign Application Priority Data

| Feb. 3, 2006 | (GB) | 0602190.1 |
| Feb. 8, 2006 | (GB) | 0602481.4 |
| Feb. 9, 2006 | (GB) | 0602577.9 |
| Feb. 15, 2006 | (GB) | 0603033.2 |
| Feb. 22, 2006 | (GB) | 0603459.9 |
| Mar. 10, 2006 | (GB) | 0604792.2 |
| May 17, 2006 | (GB) | 0609774.5 |

(51) Int. Cl.
*H02H 3/08* (2006.01)
*H02H 9/02* (2006.01)
*H02H 3/20* (2006.01)
*H02H 9/04* (2006.01)

(52) U.S. Cl. ........... 361/91.1; 361/93.1; 361/119

(58) Field of Classification Search ........... 361/91.1, 361/93.1
See application file for complete search history.

(56) References Cited

U.S. PATENT DOCUMENTS

| 2004/0150410 A1 | 8/2004 | Schoepf et al. | |
| 2005/0068710 A1* | 3/2005 | Burr et al. | 361/119 |
| 2006/0092826 A1* | 5/2006 | Karam et al. | 370/216 |

FOREIGN PATENT DOCUMENTS
WO  WO-2006/003445 A1  1/2006

* cited by examiner

*Primary Examiner* — Dharti Patel
(74) *Attorney, Agent, or Firm* — Lerner, David, Littenberg, Krumholz & Mentlik, LLP

(57) ABSTRACT

An electrical circuit comprising a power supply, a load, a first pair of parallel positive cables between the power supply and the load, a first pair of parallel negative cables between the load and the power supply, and incendive arc prevention means, in which the incendive arc prevention means comprises monitoring means adapted to monitor the first pair of positive cables and the first pair of negative cables, and to detect if the current and/or voltage in one of the first pair of positive cables deviates from the other, and if the current and/or voltage in one of the first pair of negative cables deviates from the other, and in which the incendive arc prevention means comprises a control means adapted to fully or partially isolate the power supply from the first pair of positive cables and the first pair of negative cables if the monitoring means detects that the current and/or voltage of one of the first pair of positive cables has deviated from the other, or if the current and/or voltage of one of the first pair of negative cables has deviated from the other.

23 Claims, 14 Drawing Sheets

Za ~= Zb // I[b] ~= I[a]   Iload = I[-a] + I[-b] = I[+a] + I[+b]

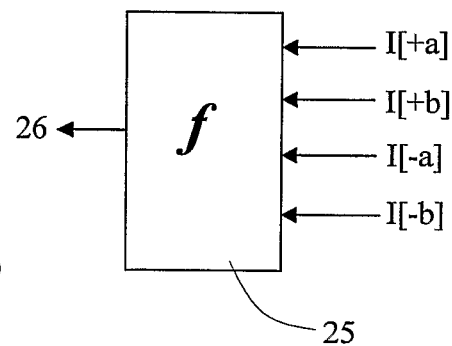
Figure 10
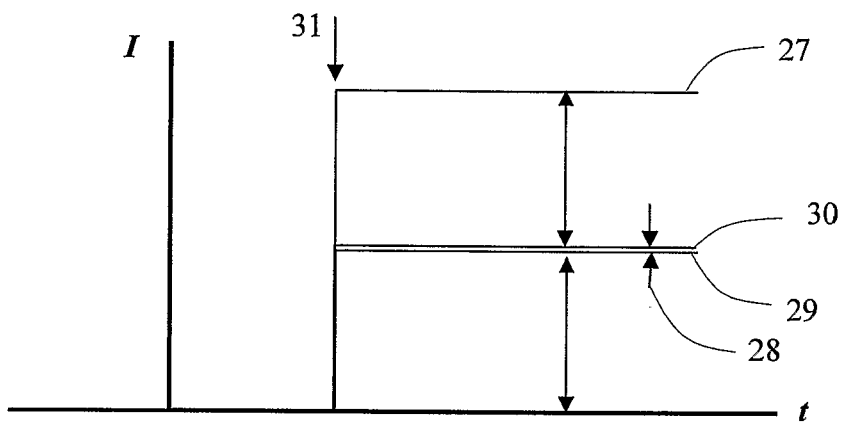
Figure 11
Figure 12
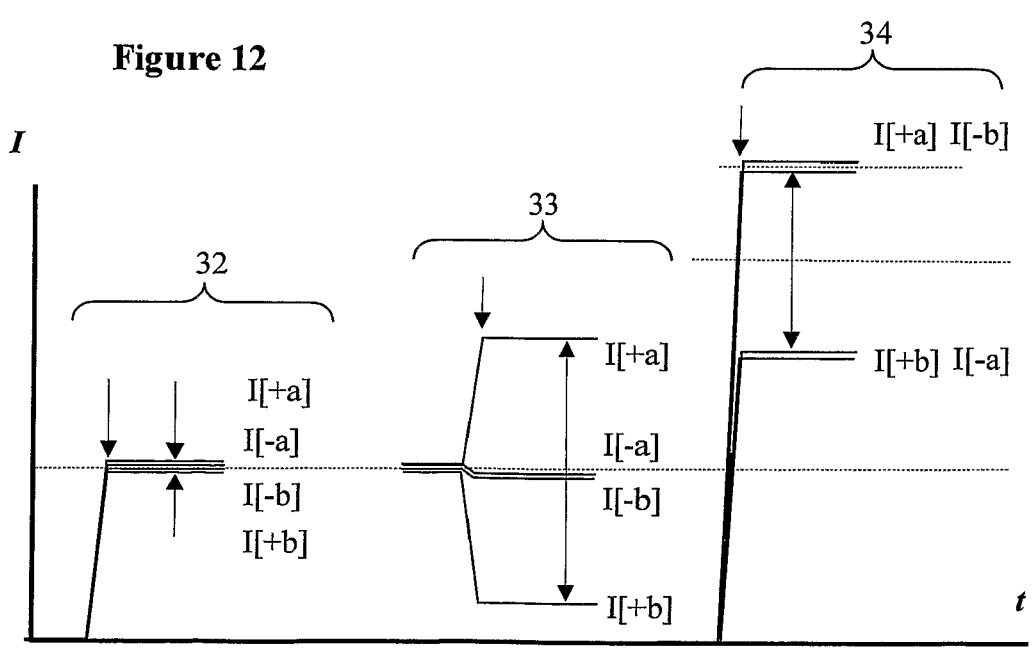

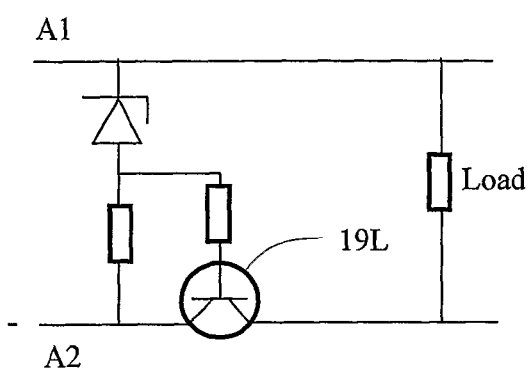
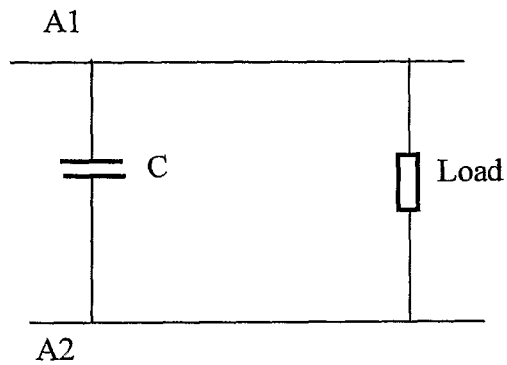
Figure 13a            Figure 13b
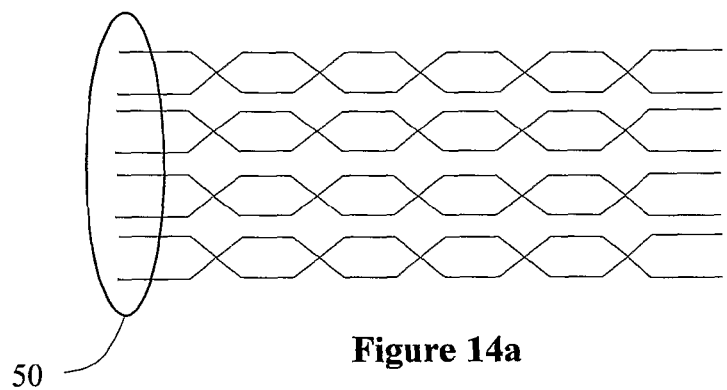
Figure 14a
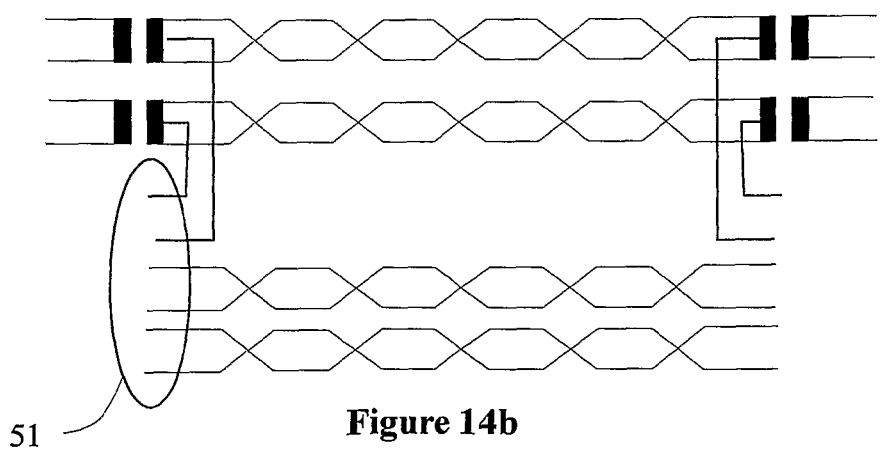
Figure 14b

ELECTRICAL CIRCUIT WITH INCENDIVE ARC PREVENTION

This invention relates to an electrical circuit with incendive arc prevention, for use particularly, but not exclusively, with an intrinsically safe Ethernet system.

Conventional intrinsically safe electrical systems, and to a point the new generation of arc detection systems, use two wires to transmit power and signals, and only use these two wires for energy restriction and fault detection.

U.S. Pat. No. 5,982,594 in the name of KEVIN M HUCZKO discloses an intrinsically safe power supply unit which only uses two wires to transmit power. A direct output crowbar and discrete impedance elements are used to dissipate and limit the energy in the power supply unit that would otherwise be delivered to an external fault, and an adaptive shut down circuit distinguishes nominal load conditions including load changes from an external fault.

WO 2006/003445 in the name of PEPPERL AND FUCHS discloses an electrical circuit which uses two wires to transmit power and signals. In this case an incendive arc prevention means monitors the electrical circuit by means of a reactor means, and if either a short circuit with the potential to cause an incendive arc, or an event with a current and/or voltage pattern which is characteristic of a propagating non-incendive arc, occurs in the electrical circuit the reaction of the reactor means is detected, and the power supply is fully or partially isolated from the event, such that an incendive arc cannot occur.

In both of these documents the electrical circuits cannot adequately discern the difference between a load interruption, and an arc or cable fault, and therefore react to load variations that do not have any load variation correction electronics. Therefore, an underlying problem with known arrangements is that either the system responds to a load change and shuts down, or complex electronic circuitry must be employed to correct load change disruption.

In addition, these known fault detection systems are only practical in circuits with a low voltage or current. In particular, the sensitivity of a two wire system has to be adjusted to suit an absolute measurement, and such an arrangement becomes less effective the greater the source voltage and/or load current, and the greater the load step changes. For example, at one or two Amperes the sensitivity would have to be increased to a point where arc detection becomes ineffective.

Furthermore, cable probing for static cable faults becomes more difficult with higher voltages and/or higher currents. Such probing is only effective with the load isolated, so the probing is in effect at steady state, and is not affected by capacitive loading and/or sensing element effects.

Further problems lie at the point of load connection, where the transition to full power exhibits constant current characteristics not conducive to fault detection and/or arc prevention. Basically, known cable probes do not allow for loads, because they can be misinterpreted as a cable fault. Furthermore, rectangular current limiting also reacts detrimentally to inrush currents caused by some loads whereby the transition stage could be insensitive to incendive faults.

However, with the introduction of Ethernet, and similar cabled systems, cables can now contain at least four, and typically eight, cores. Four of these cables are usually allocated for power, using two techniques including phantom power or discrete power. FIG. 1 illustrates the cable arrangement for an Ethernet cable. A first twinned pair of cables transmit signals, second and third twinned pairs are power cables, and a fourth twinned pair of cables receives signals. Each pair of power cables comprises a negative and a positive cable each. FIG. 1 also indicates that for higher transmission speeds, the cable lengths are limited to approximately one hundred and twenty meters.

FIGS. 2a to 2d illustrate how the power lines in an Ethernet cable can be arranged in different combinations to transmit larger amounts of power to a device. In FIG. 2a the power lines are arranged as a series coupling to increase the voltage. In FIG. 2b the power lines are arranged as a parallel coupling to increase the current. In FIG. 2c the power lines are arranged in an AC powered version, and in FIG. 2d the power lines are arranged to achieve phantom power. Of course, there are many variations of the above, but in each case the utilisation of all the available lines allows for a greater power delivery than with only a single pair of cables.

However, this use of multiple core cables does not normally support intrinsically safe circuits for use in hazardous areas containing combustible gases or liquids. (For example, WO 2004/032302 in the name of JOHANNSMEYER ET AL, discloses an electrical circuit in which continuous interruption is used to achieve intrinsic safety. Whilst this technique could be used for an Ethernet power cable, problems would arise in relation to modulating cross-talk, or interference, projected onto the remaining signal lines or any other lines in close proximity. As such this approach is not viable with an Ethernet cable.)

The present invention is intended to overcome some of the above described problems, Therefore, according to the present invention an electrical circuit comprises a power supply, a load, a first pair of parallel positive cables between the power supply and the load, a first pair of parallel negative cables between the load and the power supply, and incendive arc prevention means, in which the incendive arc prevention means comprises monitoring means adapted to monitor the first pair of positive cables and the first pair of negative cables, and to detect if the current and/or voltage in one of the first pair of positive cables deviates from the other, and if the current and/or voltage in one of the first pair of negative cables deviates from the other, and in which the incendive arc prevention means comprises a control means adapted to fully or partially isolate the power supply from the first pair of positive cables and the first pair of negative cables if the monitoring means detects that the current and/or voltage of one of the first pair of positive cables has deviated from the other, or if the current and/or voltage of one of the first pair of negative cables has deviated from the other.

Therefore, the electrical circuit of the present invention utilises four cables not only for power distribution, but to also discern the difference between a load attachment or variation and a fault with the potential to be an incendive arc. A load attachment or variation will affect both cables of a pair in the same way, while a fault will not, and therefore load influences can be ignored, and only cable faults considered.

In addition, as the incendive arc prevention means operates on the principal of detecting a difference between active cables, as opposed to just monitoring a single cable at one point, it can rely on a relative measurement between the cables to discern faults, rather than relying on an absolute measurement. As such, the electrical circuit can be made far more sensitive to potential incendive fault measurements, yet use higher quiescent or line currents.

Furthermore, the four wire system has intrinsic protection because should one polarity line make or break, then the other same polarity line will demand the major portion of the total current, because it will be of a lower resistance than the broken line, effectively starving the fault of most if not all of the incendive energy. This is the essence of bi-pinning utilised for non arcing connection in increased safety applications within Zone one or equivalent environments.

It must be also noted that any power disruption during normal operation, may, for hybrid or multi-core power/signal lines, affect the communication lines by way of crosstalk.

It will be appreciated that there are several ways that the pairs of cables can be monitored in order to detect a difference occurring between them. For example, in one embodiment of the invention the monitoring means can be adapted to separately monitor the current and/or voltage in both the positive cables and both the negative cables in order to discern if the current and/or the voltage of one of the first pair of positive cables, or one of the first pair of negative cables, deviates from the other. Such separate monitoring can be achieved with reactors in the known way.

As an alternative to this arrangement, the electrical circuit can comprise a common positive section between the power supply and the load, or a common negative section between the load and the power supply, and the monitoring means can be adapted to separately monitor the current and/or voltage in one of the positive cables, in one of the negative cables, and in the common positive section or the common negative section, whichever is provided. The control means can then be adapted to fully or partially isolate the power supply from the first pair of positive cables and the first pair of negative cables if the current and/or voltage in the one positive cable or the one negative cable deviates from substantially half the current and/or voltage in the common positive section or the common negative section, whichever is provided. This arrangement reduces the number of monitoring points required to three.

However, in a preferred embodiment of the invention the monitoring means can rely on the magnetization of common inductive reactor cores to detect a divergence in the cables. As such, the monitoring means can comprise an inductive reactor situated at a first end of each of the first pair of positive cables and a first end of each of the first pair of negative cables, and the two inductive reactors at the first end of the first pair of positive cables can share a first common core, and the two inductive reactors at the first end of the first pair of negative cables can share a second common core. A first sensor coil can then be wound round the first common core and a second sensor coil can be wound round the second common core.

With this arrangement, the common cores will be held in a demagnetized state when the current and/or voltage in the cables remains equal, but it will immediately become magnetized as soon as there is any divergence, and this magnetization can be detected by the sensor coil.

Preferably the first sensor coil and the second sensor coil can be fed to window comparators adapted to drive an isolation means adapted to fully or partially isolate the power supply from the first pair of positive cables and the first pair of negative cables as soon as signals are received from the first sensor coil or the second sensor coil.

The isolation means comprises a simple series element, or it can comprise a shunt element, which provides certain power dumping advantages described below in relation to the figures. Alternatively both can be used.

In a preferred construction an inductive reactor can be situated at a second end of each of the first pair of positive cables, and at a second end of each of the first pair of negative cables. The two inductive reactors at the second end of the first pair of positive cables can share a third common core, and the two inductive reactors at the second end of the first pair of negative cables can share a fourth common core. It will be appreciated that this arrangement makes the whole circuit far more sensitive to detecting divergence in the cables, as the reaction in the common cores will be magnified.

Although not strictly necessary, it is also possible for the monitoring means to further comprises a third sensor coil would round the third common core and a fourth sensor coil would round the fourth common core. As above, the third sensor coil and the fourth sensor coil can be fed to window comparators adapted to drive an isolation means, although this time the isolation means can be situated at the load end of the circuit. This arrangement allows the cables to be safely doubled in length as an isolation means will never be more than the ideal 120 metres from any potential fault.

All the inductive reactors described above can be provided with resistive shunts.

In the simpler versions of the invention described above in which each of the lines is separately monitored, the control means can be any known type of function circuit, for example a processor or calculator.

In these versions of the invention each of the first pair of positive cables can be provided with a diode at its load end, and each of the first pair of negative cables can be provided with a diode at its load end. This arrangement prevents reverse current injection from any inductive and/or capacitive load or other energy storing load, which effectively isolates each line from each other for detection purposes.

In a preferred construction the electrical circuit can be provided with a control means which is adapted to re-connect the power supply to the cables a pre-determined time after it has been isolated therefrom in use. This arrangement allows an event in the circuit to be identified in safety. In particular, the control means can isolate the power supply from the cables as soon as any event is detected, then discern the nature of the event when the power is reconnected. If the current measurement in each line exhibits a common mode or equal rate of change indicative of a load demand or balanced charging components, then the power remains connected, however, should the current change be unbalanced, which would be indicative of a cable fault, then the power will be isolated again. This process can repeat cyclically until the cable fault has been cleared.

One problematic area to be considered is where connectors are used to couple the cable to the load or device. At disconnection, two circuits may be disconnected at the same time, which may lead to two simultaneous incendive arcs, exhibiting the same resistive characteristics. Should this be the case, then the two arcs could be misinterpreted as a common load change, and therefore, the power supply will not be safely isolated.

To avoid this occurrence there are many solutions, but in one version of the invention the first pair of positive cables and/or the first pair of negative cables can be provided with a connector at one end comprising two pins, one for each cable, and the two pins can be different lengths. With this arrangement, upon disconnection/connection there will always be an unbalance indicative of a fault, and as such the control means will react or shutdown until both the pins have made and all faults are cleared. This technique can comprise differing solutions, for example there may be an interlock that when removed/applied disrupts one of the lines to invoke a power supply shutdown and so on.

As referred to above, the invention is intended to be used with an Ethernet cable, and therefore the electrical circuit can comprises one or more second pairs of parallel positive cables between the power supply and the load, and one or more second pairs of parallel negative cables between the load and the power supply. These second pairs of cables can be provided with their own intrinsic safety in any of the known ways. However, as an alternative the monitoring means can be adapted to monitor the one or more second pairs of positive cables and the one or more second pairs of negative cables, and in each case to detect if the current and/or voltage in one of any of the pairs of cables deviates from the other. As such all the cables in an Ethernet cable can be included in the system.

In one version of the invention if the monitoring means detects that the current and/or voltage of one of any of the pairs of cables deviates from the other, the control means can fully or partially isolate the power supply from that pair of cables and its corresponding opposite polarity pair of cables only. As such, if a fault occurs in the primary power cables of an Ethernet cable, then the power can be maintained to the signal/phantom power cables, and visa versa. Alternatively, the control mean can fully or partially isolate the power supply from all the cables.

In one version of the invention the electrical circuit can be provided with a connector comprising pins from two or more positive cables and two or more negative cables, and the pins from the two or more positive cables can be grouped together, and the pins from the two or more negative cables can be grouped together. Such an arrangement reduces the possibility of incendive arcing because no incendive arc can form between pins of the same polarity.

The invention can be performed in various ways, but a plurality of embodiments will now be described by way of example and with reference to the accompanying drawings, in which:

FIG. 10 is a diagrammatic view of a control means component of an electrical circuit according to the present invention;

FIG. 11 is a graph showing in use characteristics of an electrical circuit according to the invention;

FIG. 12 is a graph showing multiple in use characteristics of an electrical circuit according to the invention;

FIGS. 13a and 13b are diagrammatic views of parts of electrical circuits according to the present invention;

FIGS. 14a and 14b are diagrammatic views of Ethernet cables used in an electrical circuits according to the present invention;

Figure 1:
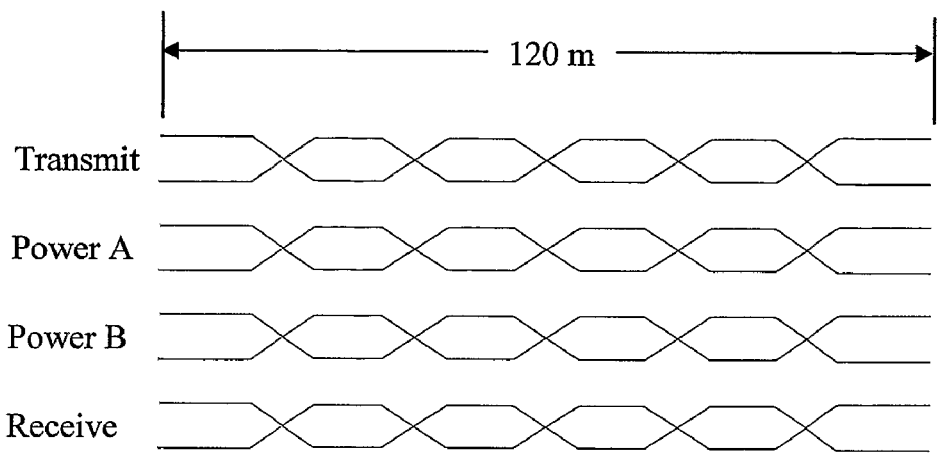
FIG. 1 is a diagrammatic view of a prior art Ethernet cable.
Figure 2A:
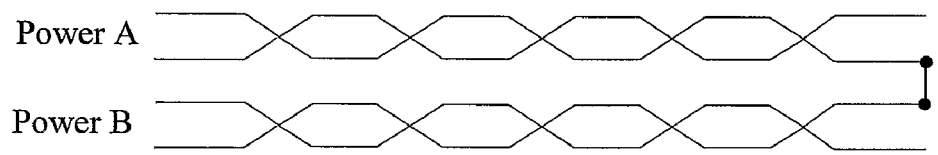
FIGS. 2a to 2d are diagrammatic views of prior art Ethernet cables.
Figure 2B:
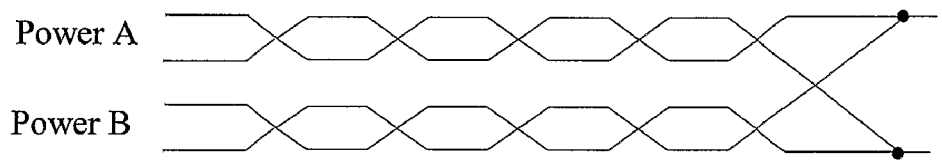
Figure 2C:
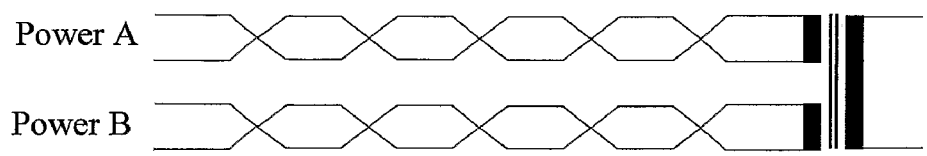
Figure 2D:
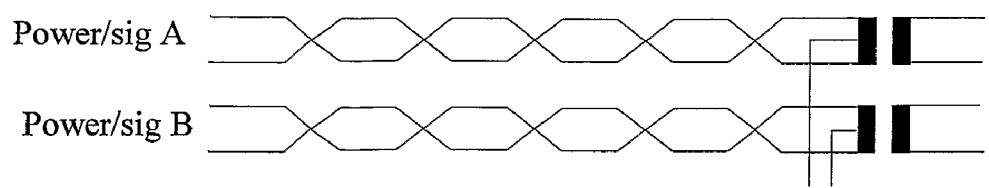
Figure 3:
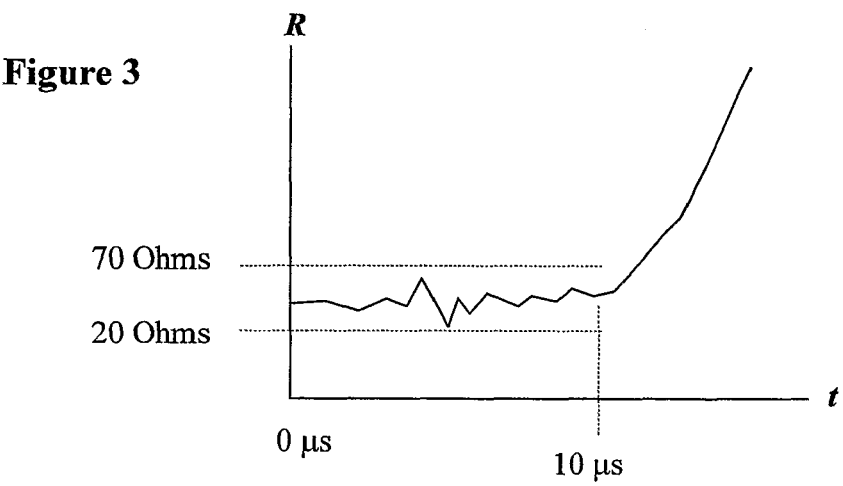
FIG. 3 is a graph showing the characteristics of a an arc.

Referring first to FIG. 3, it is understood that an arc will typically exhibit no less than twenty ohms, and no more than seventy ohms during the first ten micro seconds. As such, an arc will not be incendive for the first ten micro seconds in most cases, although in some cases this is more, in other cases less.

Figure 4:
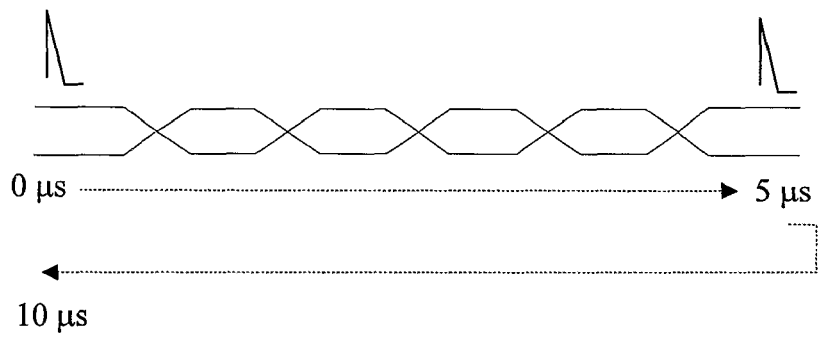
FIG. 4 is a diagrammatic view of a pair of cables.

Therefore, if an arc is to be quenched it must be detected and appropriate action taken within the first 10 microseconds or less. FIG. 4 illustrates that a cable propagation delay, accounting for arc detection and arc exhaust, must be within 10 micro seconds so an arc will not become incendive. This makes the cable propagation length limit five microseconds. Therefore, if a cable has a propagation time of six micro seconds per kilometre, then the length of cable must be limited to eight hundred and thirty meters.

However, the electronic detection of an arc requires some time to operate effectively, and therefore in practice a cable length of four hundred meters is considered a practical limit. Therefore, an Ethernet cable restricted to one hundred and twenty meters allows a significant margin, and also allows the possibility of power exceeding twenty five watts, and possibly up to one hundred watts or more.

Figure 5:
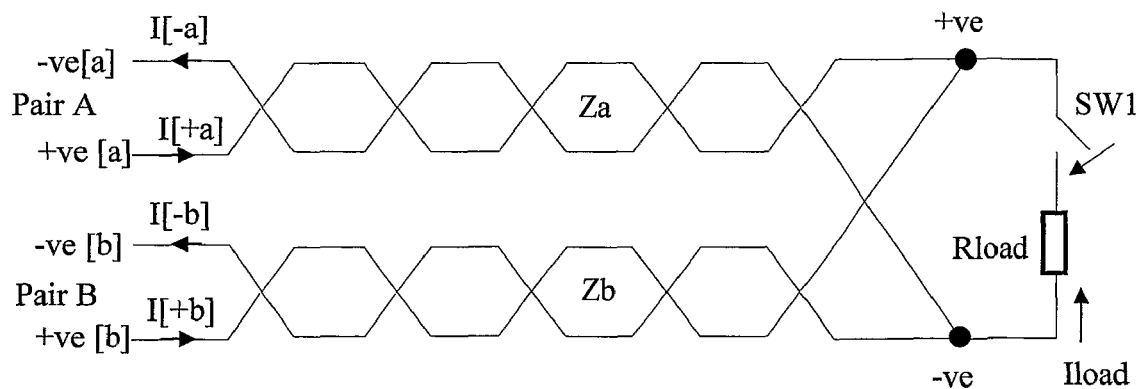
FIG. 5 is a diagrammatic view of an electrical circuit according to the present invention.
Figure 6:
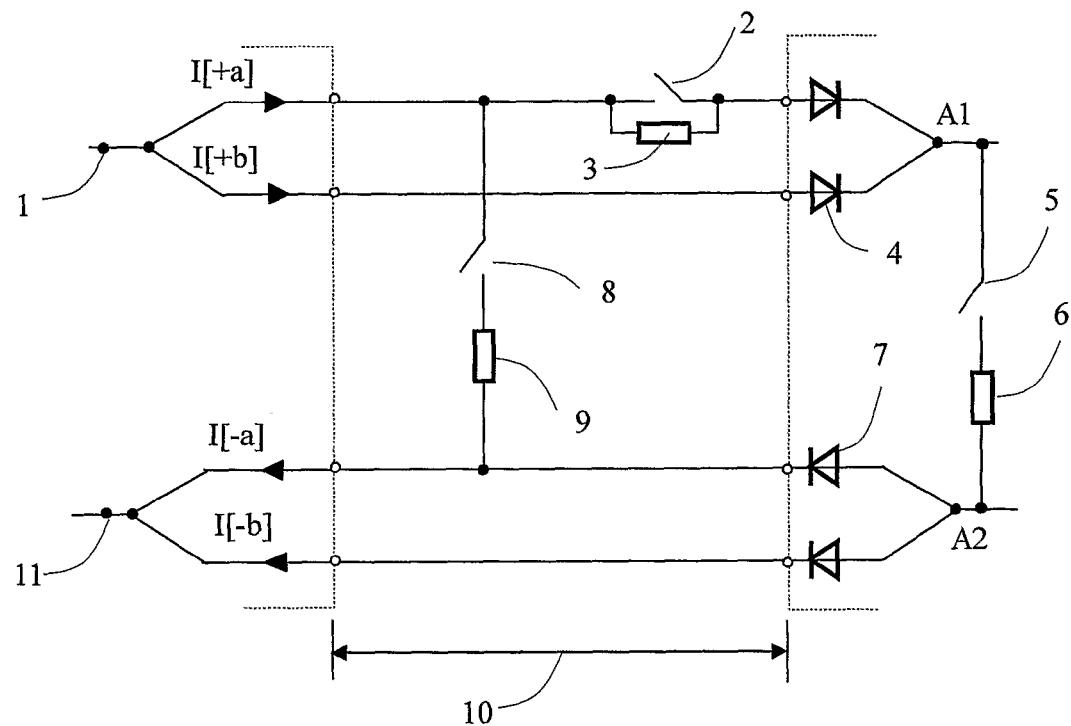
FIG. 6 is an alternative diagrammatic view of the electrical circuit shown in FIG. 5.

FIGS. 5 and 6 show a first embodiment of the invention. FIG. 5 shows two pairs of power cables, Pair A and Pair B, in an Ethernet cable, which are arranged with the two positive cables +ve [a] and +ve [b] in parallel, and the two negative cables −ve [a] and −ve [b] in parallel. It can be understood from this diagram that as the impedance Za of Pair A is similar to the impedance Zb of Pair B, a load Rload attachment or a variation activated by a switch SW1, will demand a current load equally distributed between the pairs. For example, current I[+a], I[−a], I[+b], I[−b], will increase to a similar level at a similar time. (This is illustrated in FIG. 11, where it can be seen that on switch activation 31, the load demand 27 is N Amperes and the distributed current 29, 30, through each pair Pair A and Pair B is equal or N/2 Amperes, allowing for tolerance 28.)

FIG. 6 shows the same circuit shown in FIG. 5, but the positive cables and the negative cables are shown side by side for ease of explanation. FIG. 6 illustrates how fault detection and load differentiation is accomplished where the cable is arranged in the hazardous area 10 as two positive cables connected together, and two negative cables connected together. Intersect blocking diodes 4 and 7 are provided on the cables, and they serve to prevent reverse current injection from any inductive and/or capacitive load, or other energy storing load, so the lines are effectively isolated from each other for detection purposes.

The current and/or voltage in/at each line is monitored in any of the known ways by an incendive arc prevention means comprising a monitoring means and a control means (not shown), and if there is a similar (common mode) change in each line, then this will be indicative of a connection or disconnection of load 6 or power sources 1 or 11, or of a load or supply variation, change or demand. In other words a common mode change in the lines will indicate a normal non-incendive event. However, should there be a differential change in each line, then this will be indicative of either a series resistance 3 or change 2, or a shunt resistance 9 or change 8 within the cable system 10. If everything is operating normally then this differential change can only occur with the cable system 10. The diodes 4 and 7 assist in the detection of a shunt fault 9, as without them detection would be difficult because the current would be re-distributed amongst the remaining cables.

The detected resistance change in the cable system 10 may comprise a shunt or series arc with or without an incendive potential, or a cable break or short circuit. As described above, a propagating arc typically has a resistance of between twenty and seventy ohms, and such a step resistance change in a given line must be detectable and discernable. The system has an upper and lower detection threshold, and anything beyond these thresholds is non-incendive. At the lower end, if an event can't be detected then it is not incendive, whereas at the upper end, if the shunt resistance is greater than one thousand ohms, and the supply voltage is forty eight Volts, then any subsequent break will not be incendive. (Transitional arc faults may not be detectable, nevertheless this must be at a rate of no more than one in one thousand or better.)

The monitoring means (not shown) only need to take measurements once in each loop to assess the differential mode change in current Once the detection of a cable fault is made, the adequate isolation of power to the fault in a timely manner is performed by the control means (not shown), in order to interrupt the fault or arc from becoming incendive. This can be done in any of the known ways, and the isolation of the power must occur within the first ten microseconds, and must be to a level and time that prevents the arc from becoming incendive, for example the power may be isolated by a shunt clamp or a series switch for a period of 10 microseconds.

One advantage of this four wire system is that a break or a break arc along one cable will cause current to be shunted onto the remaining cables, with a consequential reduction in power available to the break or break arc. The reduction is obviously proportional to the system components and the nature of the fault.

Following the interruption, the control means (not shown) reconnects the power supply immediately, provided the current measurement in each line exhibits a common mode or equal rate of change indicative of a load demand or balanced charging components. However, should the current change be unbalanced, which would be indicative of a cable fault, the control means repeatedly isolates and reinstates the power supply until the cable fault has been cleared.

One problematic area to be considered is where connectors are used to couple the pairs of cables to the load 6. At disconnection, two circuits may be disconnected at the same time, which may lead to two simultaneous incendive arcs, exhibiting the same resistive characteristics. If this occurred then the two arcs could be misinterpreted as a common load change by the control means and it would not safely isolate the power supply.

Figure 7:
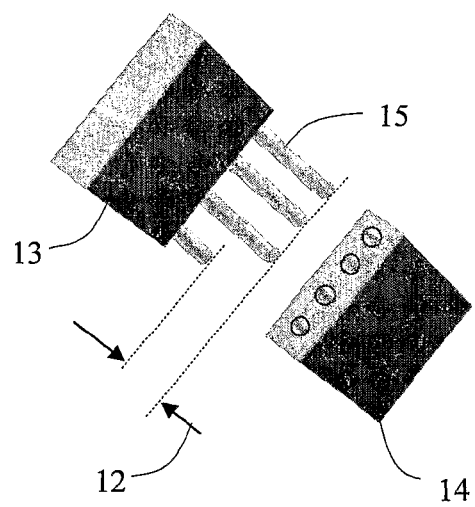
FIG. 7 is a perspective view of a connector for use with an electrical circuit according to the present invention.

There are several ways to overcome this problem and FIG. 7 illustrates one solution comprising a plug 13 and socket 14 arrangement in which connecting pins 15 are different lengths. One pin is deliberately set shorter than the other pins, as shown at 12, so that two circuits cannot be disconnected or connected simultaneously. Instead, upon disconnection or connection there is always an unbalance indicative of a fault, and the control means isolates the power supply until all the pins have made, and all possible faults are cleared. From there the control means operates as normal and monitors the cables for a differential mode disruption. (This technique can be altered slightly, for example one pin can be longer than the others rather than shorter, or an interlock can be provided which disrupts one of the lines during disconnection or connection in order to invoke the control means to isolate the power supply.)

It is theoretically possible for two poles to short simultaneously to the two opposite poles, and if this happened an incendive situation would occur without a reaction. (This is of course exactly the same for classic isolated IS circuits where two positive poles shorted to two negative poles is incendive.) However, this possibility can be discounted, because it would require i) both the matched positive lines and/or both the matched negative lines to be cut or break simultaneously, ii) for both pairs to simultaneously arc, iii) for both pairs to do so with a perfectly matching arc impedance, iv) for both pairs to be at an incendive potential on the first strike, v) for there to be an incendive gas/air mixture at the point of the cut in a Zone 1 environment, and vi) for the arc or arcs to ignite it.

When one considers that a "simultaneous" cut or break would have to be within a few hundred billionths of a second for the electronics in the system to miss it, then it can be seen that the event is an unlikely scenario, and certainly less likely than encountering an unusual single incendive arc that could be missed by known systems. (In fact, a single series element current limiter failing short circuit, with a subsequent redundant series element failing short circuit without detection, is a more probable scenario. Equally, two arcs from two independent and isolated known intrinsically safe circuits could be set off within a few millimetres of each other and combine the localised arc power to become incendive. However, this is not considered as a likely scenario by the major test houses and is normally discounted.)

Figure 8:
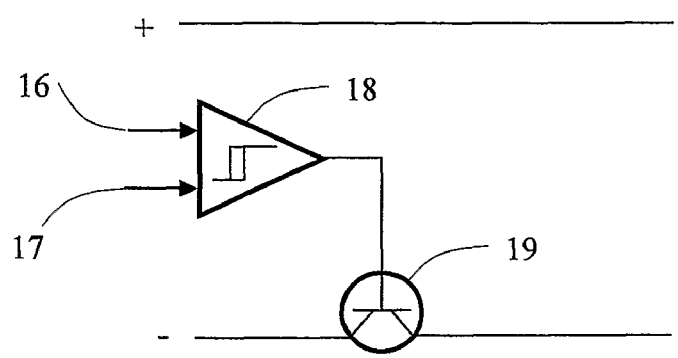
FIG. 8 is a diagrammatic view of a part of an electrical circuit according to the present invention.

FIG. 8 illustrates a possible means by which the control means described above can isolate the power supply from the circuit upon cable fault detection. In this case a series element 19 is used to break the circuit, but variations could include shunt clamps and/or series elements. The driver 18 for the series element 19 comprises a deadband function or hysteresis, so it doesn't fall into an oscillatory state, and also so the series element 19 is adequately isolated for a required period of time to fully quench an arc. An alternative to an analogue deadband could comprise a mono-stable element, a flip-flop element or a timer circuit and so on.

The input 16 is referenced to a set point 17 so tolerances, such as background noise, LRC unbalance or interruptions that may be considered safe, are ignored. During a fault condition, the control means must repeat it's cyclical isolation and reconnection of the power supply in such a way that any incendive condition do not occur. In this case it uses a cyclic waveform repetition of one hundred kilohertz, but this could be greater.

Figure 9A:
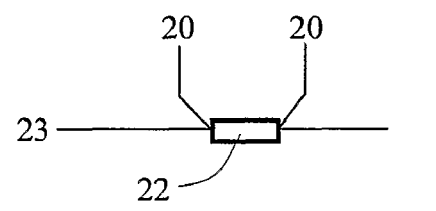
FIGS. 9a to 9d are diagrammatic views of monitoring means components of electrical circuits according to the present invention.
Figure 9B:
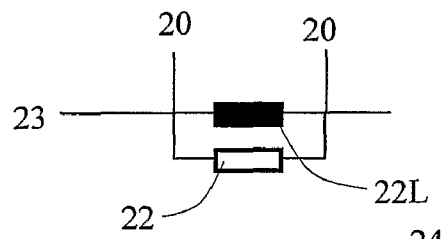
Figure 9C:
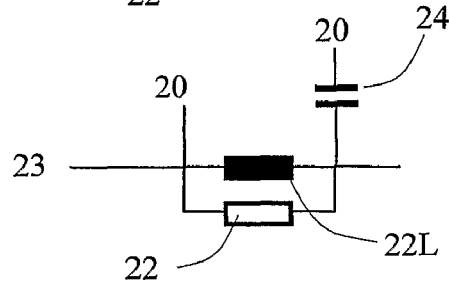
Figure 9D:
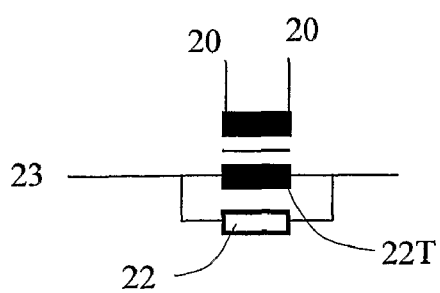

FIGS. 9*a* to 9*d* illustrate possible monitoring means as referred to above and for use with the above described circuit, which are adapted to monitor the cables for faults. In FIG. 9*a* a resistive current measurement is used to monitor line 23. In FIG. 9*b* an inductive reactor 22L with optional clamping resistor 22 is used. In FIG. 9c an AC coupling 24 which allows DC elimination for high-line measurement is used, and FIG. 9d illustrates the introduction of transformer coupling that may also include voltage amplification or attenuation. It must be noted that at this point, that as any differential mode measurement must be made within the first ten microseconds, the detection can comprise AC and/or DC measurement.

Figure 17:
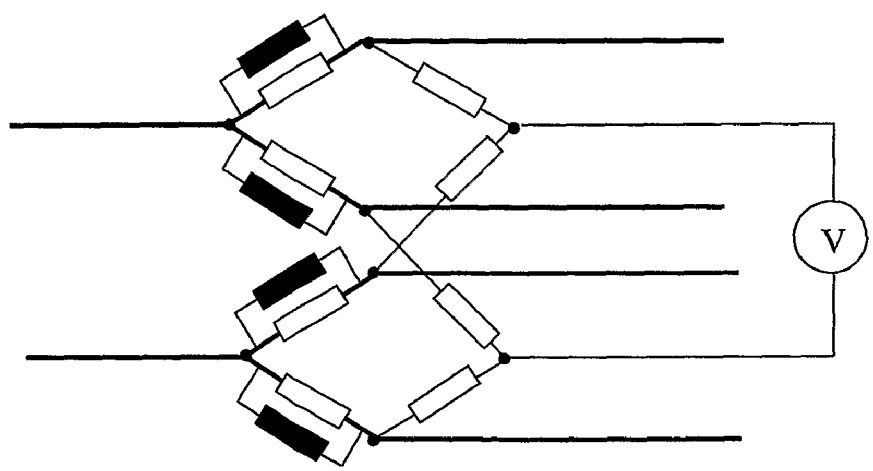
FIG. 17 is a diagrammatic view of monitoring means components of an electrical circuit according to the present invention.

The monitoring means shown in FIGS. 9a to 9d are used separately on each of the four lines, so there are at least four measurement points. However, FIG. 17 illustrates an alternative arrangement utilising a bridge network in order to reduce the number of measurement points to two. Inductors are used as in FIG. 9b, and each path is shown with an optional isolating transformer, which can be used when phantom power is required.

It will be appreciated that the above described monitoring means are just examples and that there are many other ways the same results can be achieved. Those skilled in the art will be able to implement adequate measurement techniques and to design them in accordance with EN50020 or the equivalent.

FIG. 10 illustrates a control means as referred to above and for use with the above described circuit, which comprises a function 25, which could be a processor or calculator. The function 25 is adapted to analyse incoming event signals from each line I[+a] to I[-b], and to transmit a power isolation signal 26 if required. For isolated loops the number of input lines can be reduced to two. The function 25 is adapted to discern common mode influence from differential mode influence, noise and optionally, non incendive differential mode influence. The circuit in function 25 can be a fast digital processor or analogue to digital logic circuit for the decision process. Such circuits can be designed by those skilled in the art, and will not be further described here.

FIG. 11 illustrates the type of event which would be ignored. A common mode switch on activation 31 leads to a load demand 27, and the distributed current 29, 30, through each loop is equal, allowing for tolerance 28.

FIG. 12 illustrates different incoming event signals which are indicative of common mode or differential mode events, and which can be discerned in order to indicate what type of fault has occurred. Firstly, current signature 32 is a common mode disruption with tolerance, which is indicative of a common mode step change as a result of power up, and/or a load change, such as that illustrated in FIG. 11. It is not a cable fault or an unbalanced cable disruption, and if such signals were received by the function 25 they would be ignored, it would not transmit a power isolation signal 26.

However, current signature 33 is typical of a cut in any of the lines, including a propagating arc across the cut. The current I[+a] in one positive cable has increased, while the current I[+b] in the other positive cable has decreased. If such incoming signals were received by the function 25, it would transmit the power isolation signal 26 to actively isolate the power supply from the fault.

Curve signature 34 is typical of a shunt short or shunt arc between one of the two positive poles, and one of the two negative poles. Again, if such incoming signals were received by the function 25, it would transmit the power isolation signal 26 to actively isolate the power supply from the fault Any other types of incoming signals will not be incendive, for example a positive pole to positive pole short circuit will not be incendive, and equally, a negative pole to negative pole short circuit will not be incendive.

It will be appreciated that any cable leakage or resistive failure, including a connector failure, can also be detected by the function 25 for preventative maintenance purposes. For example, a slow increase in current for one pair could be detected, and this would be indicative of water ingress and so on.

The control means can be arranged so it will react only to arcs which actually have the potential to become incendive, and will ignore arcs that would not become incendive. For example, if a resistive fault occurs, and it is a differential mode fault, then the power supply may not need to be isolated from the fault if the path's resistance is high enough to limit the power to the arc. Such an event can be discerned because it will not have the characteristic of a constant current device.

The above described circuit could be enhanced by having an infallible collapsing circuit at the load 6 point, and/or an infallible capacitive load that forces the load into quasi-constant resistance and/or constant fixed voltage. This technique may be beneficial in some instances, but it will only provide minor advantages at lower currents because the energy stored in a given cable length is mainly a factor of current. However, the cable length, and therefore the inductance, is quite low in Ethernet so the advantages of maintaining constant voltage at the load point may be beneficial. However, having said that, the above described control means will react faster than the cable discharge time, so if the arc can be quenched within the 10 microsecond timeframe, the benefit of such systems may be questionable.

FIG. 13a illustrates a possible way to achieve the above, in which a collapsing circuit similar to that described in WO 2006/003445, is used to fix a minimum load resistance. FIG. 13b, illustrates an alternative arrangement in which a fixed capacitor is utilised to maintain a quasi resistance limit. The potential in any arc is dictated by the voltage cross the load, the power supply voltage and/or the back e.m.f. voltage generated across the arc, so these arrangements will reduce the potential across any arc. However, for circuits requiring high power the minimal resistance levels will be only slightly advantageous.

It will be appreciated that the above described four wire circuit could be expanded to include further pairs of wires, and this is particularly applicable in an Ethernet cable with its eight wires. For example, FIG. 14a illustrates a circuit in which all of the four pairs of wires in an Ethernet cable are monitored for fault discerning, as shown at 50, and not just the two pairs of power lines or the two pairs of signal/phantom power lines. FIG. 14b illustrates a circuit in which the signal/phantom power lines are utilised for fault discerning alongside the power lines, as shown at 51. In this circuit the control means will isolate the power supply from all the lines if a fault is detected in any of them, and in particular where a power line arcs over to, or is shorted to, a signal/phantom power line. This arrangement is advantageous when the signal/phantom power lines are used to compliment the power distribution. Of course, galvanic isolation and/or segregation may prevent the need for such an arrangement.

Figure 16:
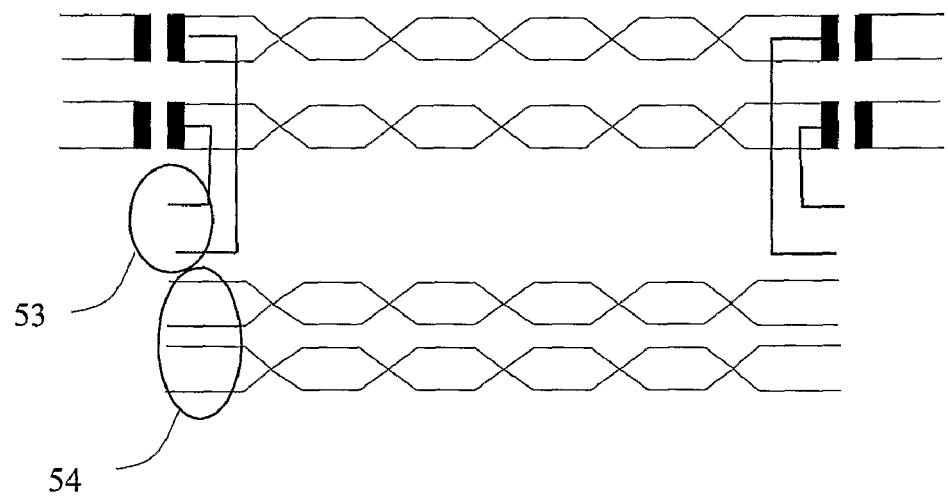
FIG. 16 is a diagrammatic view of another Ethernet cable used in an electrical circuit according to the present invention.

As an alternative, the signal/phantom power lines can be made intrinsically safe separately from the main power lines. FIG. 16 illustrates a circuit in which the signal/phantom power lines and the main power lines are monitored for fault discerning separately from one another, as shown at 53 and 54. As such the control means will only isolate the power supply from the part of the circuit which experiences the fault. This means the signal/phantom power lines can remain operational if a fault occurs on the main power lines. The signal/phantom power lines can be monitored in the same way as the power lines, or they can be made intrinsically safe separately from the power lines in any of the known ways, for example by being low power.

In either of the above two arrangements the voltage in the signal/phantom power lines can be elevated to prevent arcing between cables of the same polarity from the main power lines and the signal/phantom power lines.

Figure 15:
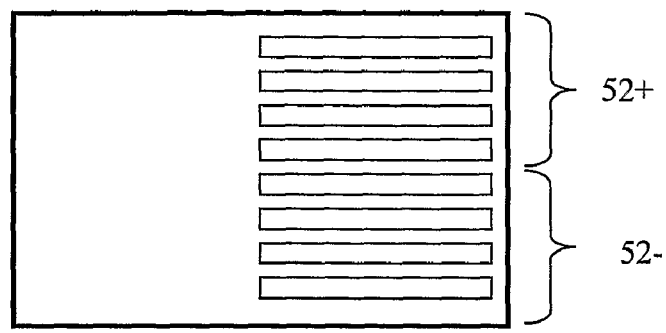
FIG. 15 is a diagrammatic view of connector used in an electrical circuit according to the present invention.

As Ethernet is arranged as pairs of positive and negative cables, an arc could from between any adjacent cables. However, no arcs will form between cables of the same polarity, therefore, in any of the above described circuits connectors are used which group the positive lines and the negative lines into two groups, to minimise the potential for incendive faults. FIG. 15 illustrates such a connector in which all the positive lines 52+, (which have voltages within twenty percent of each other), are positioned together, and so are all of the negative lines 52−. As such only the two adjacent positive and negative lines present the possibility of an incendive arc, although it will obviously be dealt with in the event of a fault. This arrangement may also apply to other lines in close proximity, however it will not be a consideration for connectors with adequate clearance between the lines.

The above described circuits work in theory, but they are limited by the quality of the components available. For example, the diodes 4 and 7 in FIG. 6 would have to be 'ideal diodes' for the circuit shown therein to function correctly, and in practice ordinary diodes are not efficient enough. In addition, there are some faults that can lead to an incendive arc which would not be detected by the above described circuits, particularly under a high load and a high source voltage. For example its possible for an oxide layer or a bridge to form between lines or terminals at a slow rate, and at a resistance or rate that cannot be detected under all load conditions, and such a fault might not be resistively safe at a given source voltage, and an arc could form through a fault in the bridge if the oxide layer breaks open or parts to form an arc. This type of fault scenario differs from a resistive oxide layer falling across the terminals, which can be detected quite easily. It is therefore necessary for a practical circuit to use an alternative arrangement to increase the sensitivity.

Figure 18:
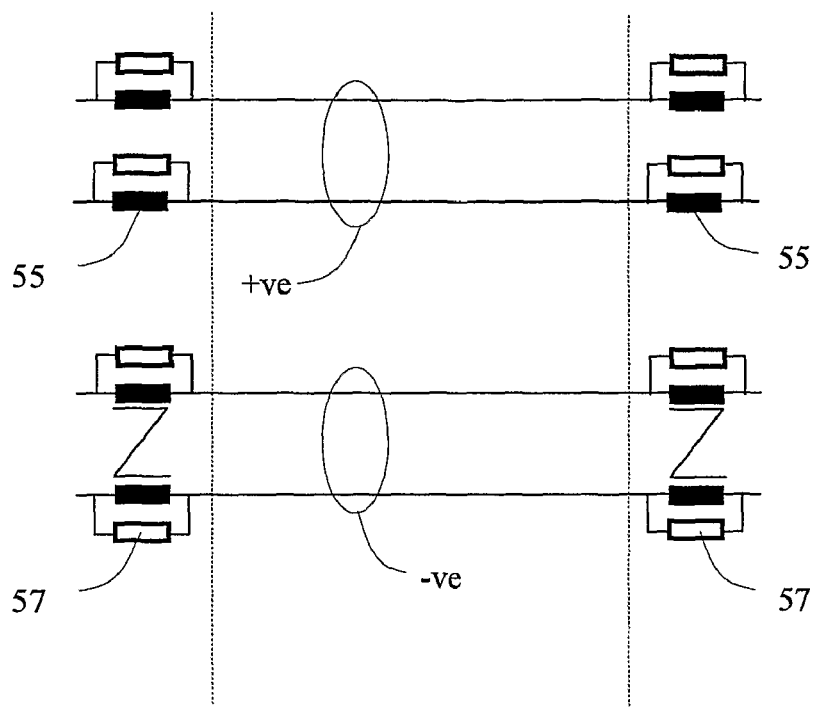
FIG. 18 is a diagrammatic view of a portion of an electrical circuit according to the present invention.

FIG. 18 illustrates two alternative circuit arrangements which are sensitive enough to detect faults like that described above, and which do not require any diodes. Instead, inductive reactors 55 or 57 are placed at each end of each line, replacing or complimenting the exampled diodes. The reactors 55 are simple inductors with optional resistive shunts, and the reactors 57 are the same but with common cores. Measurement of the reactor can be performed by direct connection, or by a further winding (not shown), as illustrated in FIG. 9d.

Figure 19:
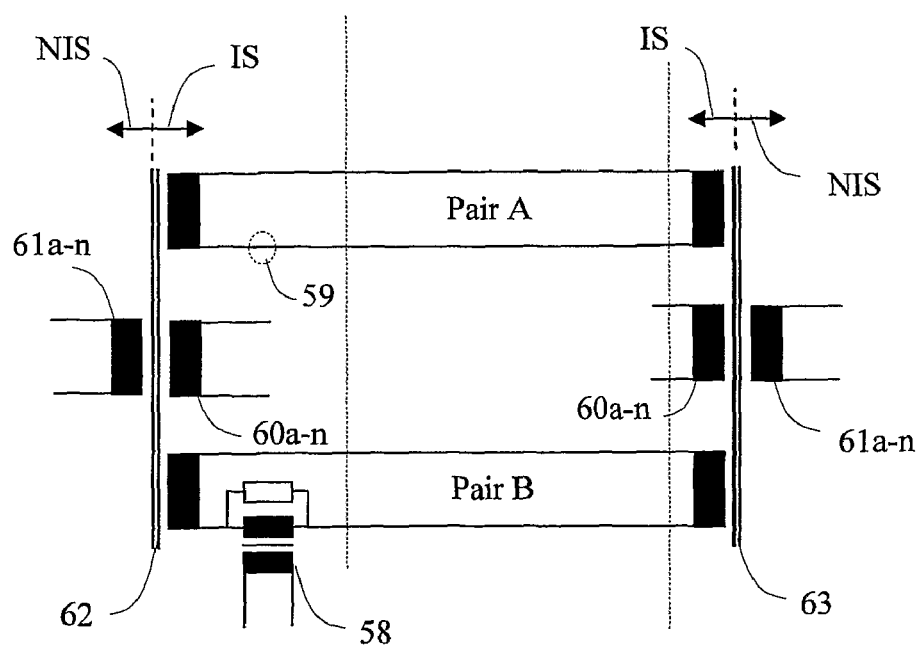
FIG. 19 is a diagrammatic view of a portion of an electrical circuit according to the present invention.

FIG. 19 illustrates an electrical circuit like that described above, but which uses AC power instead of DC, and in which Pair A and Pair B are isolated from each other. Each pair is monitored, as shown at 59 and 58, and the measurements compared. Similar loading or delta change within each pair will be attributed to loading and/or switching, and will be ignored by the control means, whereas a differential change will be attributed to a fault or a potentially incendive arc, and appropriate action will be taken. Isolation between pairs could also illuminate the requirement for cross-fault detection.

The circuit shown in FIG. 19 has a further advantage. The transformers 62 and 63 are constructed with intrinsically safe segregation in accordance with EN50020, such that they have an intrinsically safe side IS and a non-intrinsically safe side NIS. As such, one or more windings 61a-n can be used for non-intrinsically safe circuits, and one or more winding 60a-n can be used for intrinsically safe circuits. Further windings (not shown) can be attached for additional fault detection and/or power quenching or damping by way of shorted turns.

Means by which the control means can isolate the power supply from the electrical circuit can be applied to any point in the circuit, including in Pair A or Pair B, and can comprise shunt and/or series elements. The electrical circuit can operate at fifty or sixty Hertz AC power, however for greater efficiency and without compromising the integrity and cost, four-hundred Hertz is more effective. Four-hundred Hertz is also advantageous because multiple intrinsically safe and non-intrinsically safe interfaces are achievable on one former. Linear four hundred hertz technology also has distinct advantages over non-linear isolated switching regulators because the transformers are less expensive, they have better tolerance to segregation, the component count is reduced, the integrity is increased and the noise influence is negligible. The isolated Pairs A and B can also be converted to DC If required.

Figure 20:
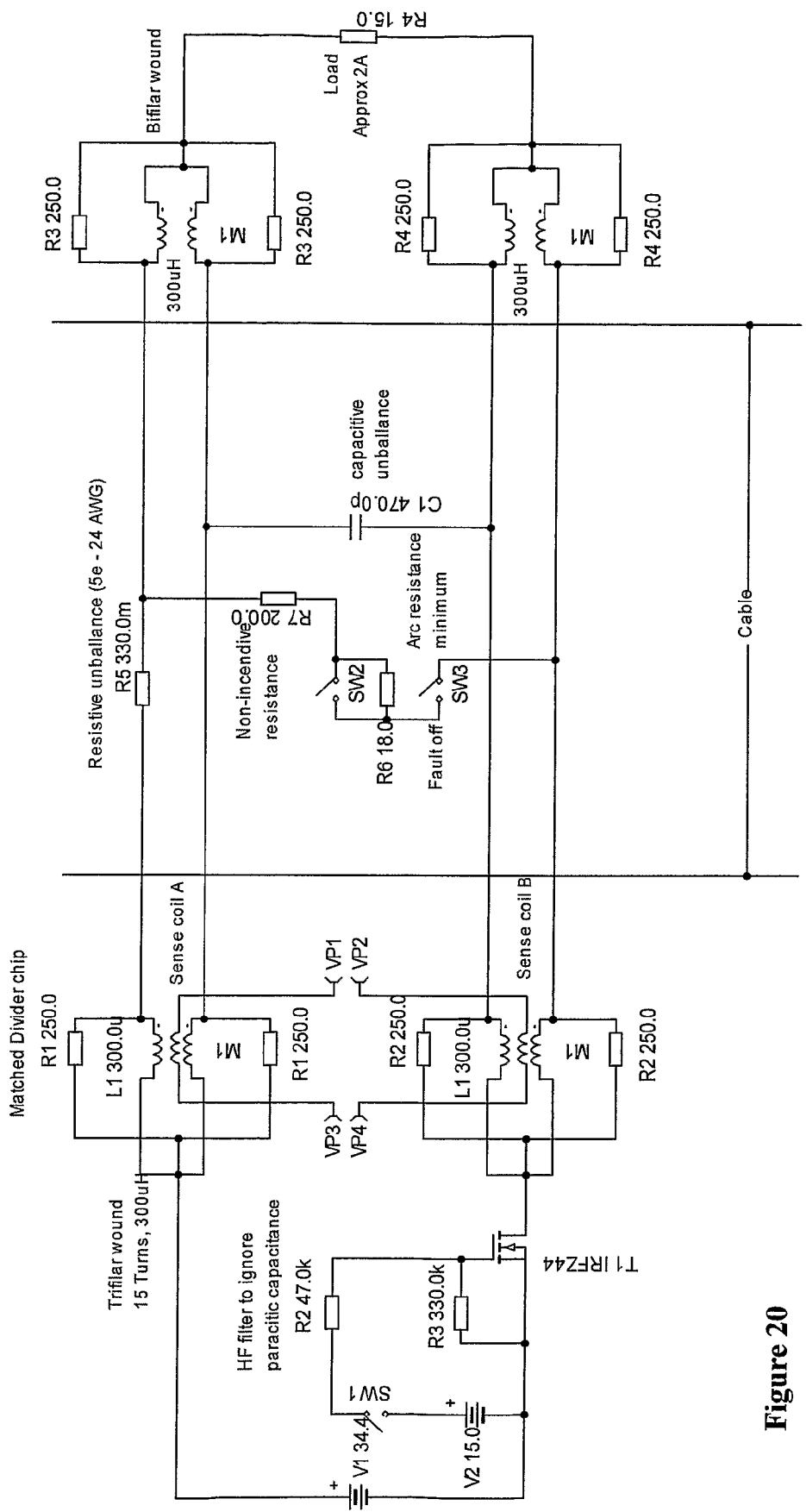
FIG. 20 is a circuit diagram showing an electrical circuit according to the present invention.

FIG. 20 illustrates a practical working electrical circuit using the above described arrangements. Balanced resistors with balanced mutual inductors are provided at each end of each pair of lines. As such the common cores are held in a demagnetized state when the current and/or voltage in the cables remains equal, but immediately become magnetized as soon as there is any divergence, The inductor nearest to the power supply incorporates a third winding for fault detection. As soon as the common core becomes magnetized this will be detected by the sensor coil. However it will be appreciated that other methods of monitoring the lines could be used instead, for example a resistor bridge. In this circuit the monitoring is only performed at one end of the cable, however it will be appreciated that a mirror arrangement can be provided at the load end of the cable, so fault detection and power quenching can take place at both ends of the circuit.

The above described electrical circuit can be altered in various ways to achieve various ends, and a number of alternative constructions are described below.

It should be noted here that it may be necessary to place diodes strategically, in line or in shunt, around the circuit in order to satisfy EN50020. As such the means by which the power supply is isolated from the rest of the circuit, such as shunt and/or series power quenching elements, must be arranged so they work in conjunction with said diodes. Furthermore, the quenching element can also be provided with loads to adequately dissipate energy generated within the cable system. Lastly, the monitoring system may also be tuned to provide the least influence and/or the greatest energy absorption.

Figure 21:
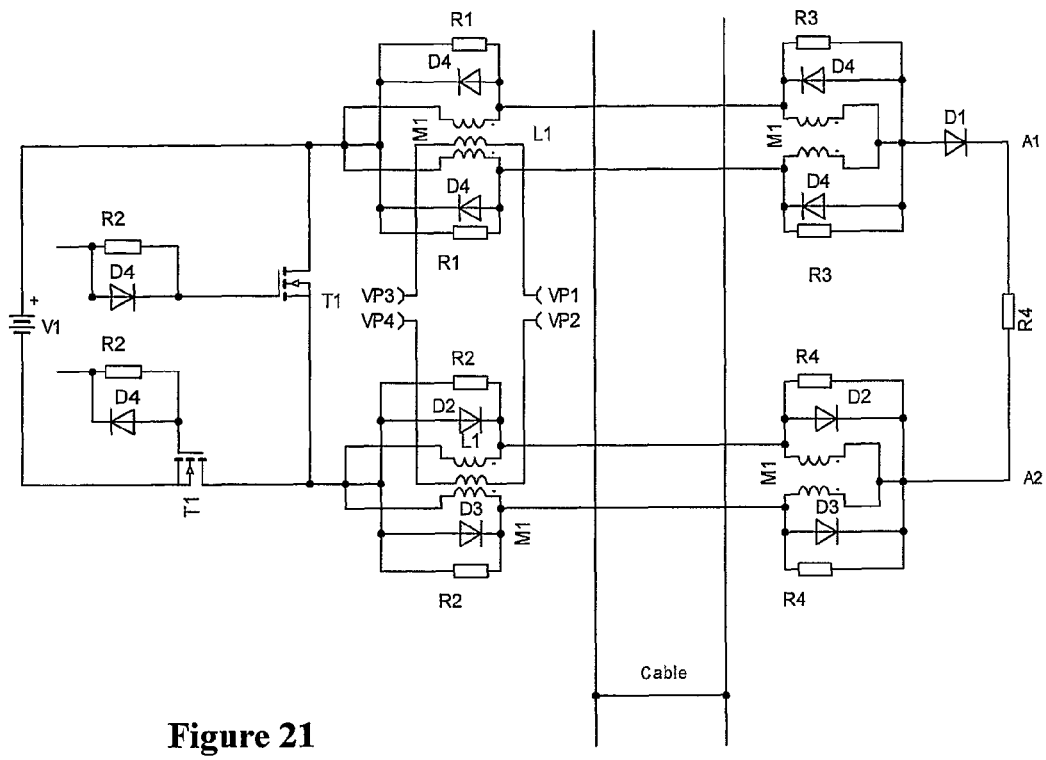
FIG. 21 is a circuit diagram showing an electrical circuit according to the present invention.

FIG. 21 illustrates an electrical circuit which achieves the above requirements. The electrical circuit is similar to that shown in FIG. 20, but protection diodes are placed around the circuit, and optional systems for cable power dumping are provided, comprising T1 either in shunt and/or in series, on one or both rails. Of course, for the shunt method, the power supply must be protected from the shunt and this can be achieved in any of the known ways, including simultaneous series isolation or current limiting.

Figure 22:
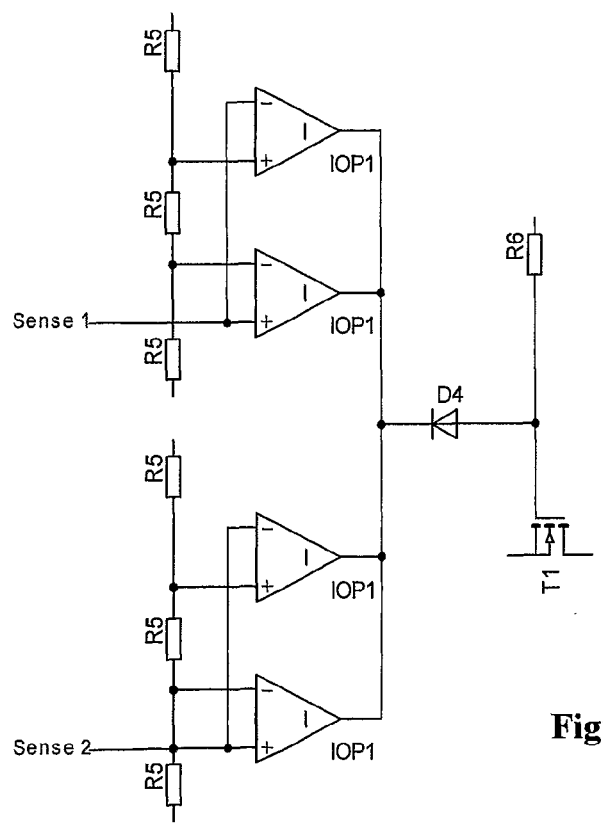
FIG. 22 is a diagrammatic view of a control means component of an electrical circuit according to the present invention.

FIG. 22 illustrates a possible monitoring means for use with the above described circuits, which monitors the mutual inductor windings. Two window comparators are utilised so the output signals from the coils can be unison, positive, negative or opposed, depending on the fault type and position. When a fault is detected, the comparators will act to isolate the power supply from the rest of the electrical circuit.

Figure 23:
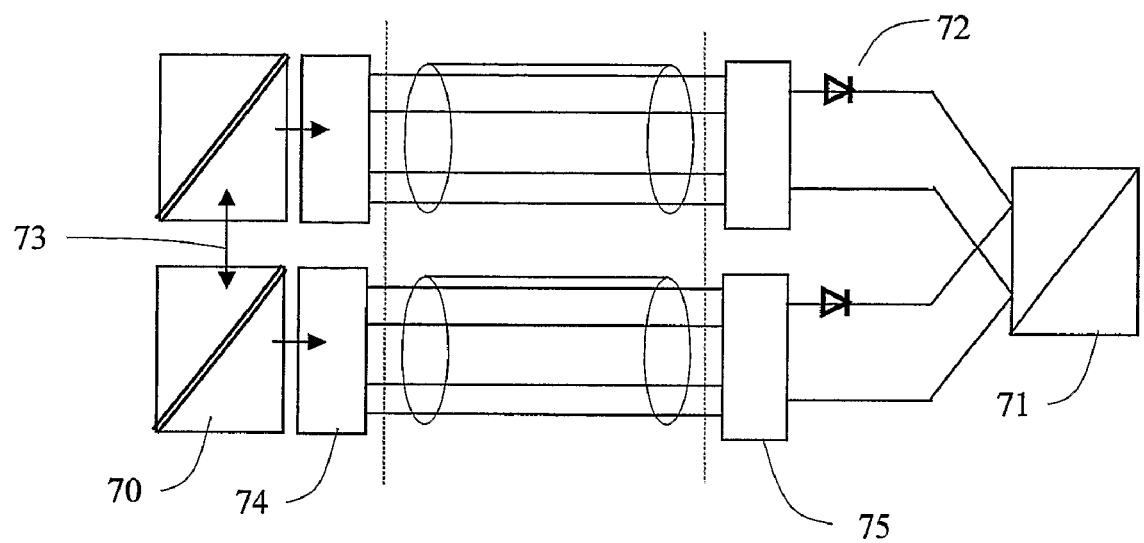
FIG. 23 is a diagrammatic view of an electrical circuit according to the present invention.

FIG. 23 illustrates how the above described electrical circuits can be provided with redundancy for added integrity. In the circuit shown in FIG. 23 two power supplies 70 with load share option 73, feed discrete monitoring and control means 74 with optional alarm annunciation, and two separate cable systems. Further discreet monitoring and control means 75 are provided at the load end of the cable, and are diode coupled, as shown at 72, to feed a common load or additional power converters 71.

Figure 24:
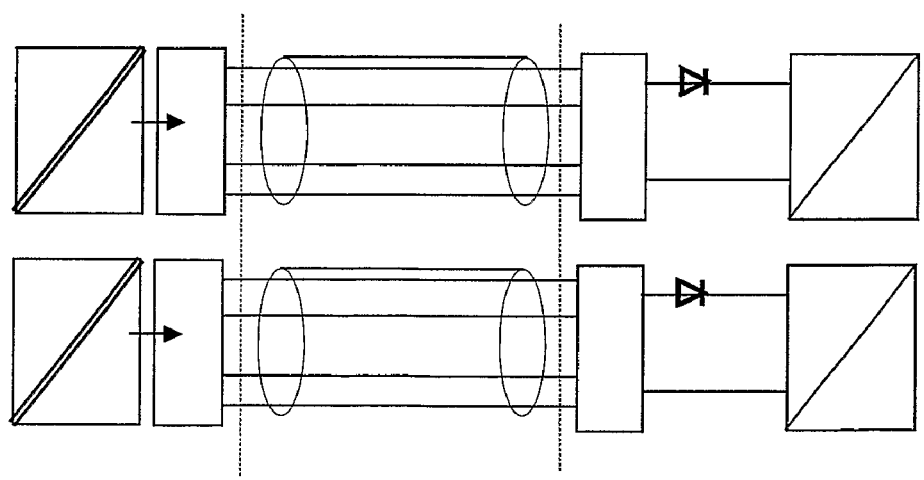
FIG. 24 is a diagrammatic view of an electrical circuit according to the present invention.

Should a higher integrity load or power converter be required, then it can be made autonomous. FIG. 24 shows such an electrical circuit where the outputs can be used independently or, of course, diode coupled.

Figure 25:
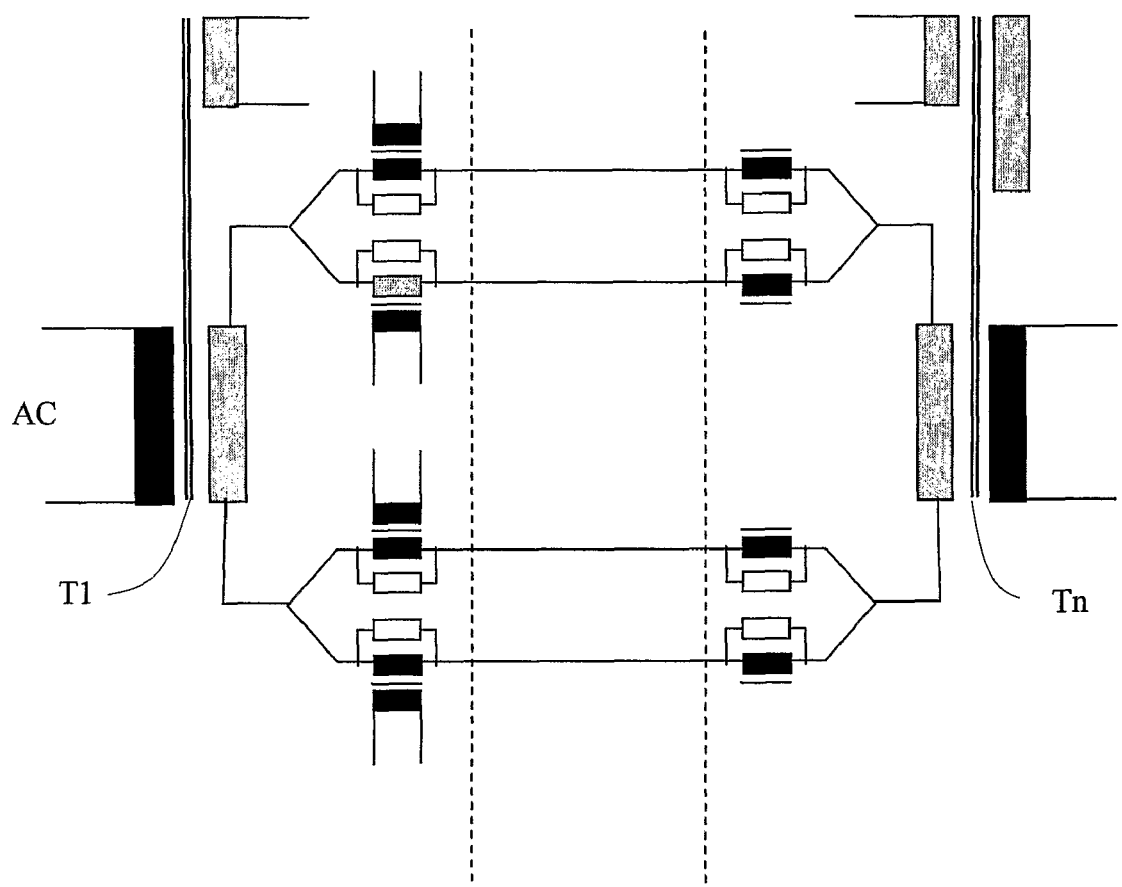
FIG. 25 is a diagrammatic view of an electrical circuit according to the present invention.

FIG. 25, illustrates an electrical circuit with an alternative means for distributing AC power, and is different to the circuit shown in FIG. 19 in that the power transmit and receive coils are single windings, with a possible centre tap for ground fault detection. The power transmitting transformer T1 comprises intrinsically safe segregation, and may comprise further intrinsically safe or non-intrinsically safe windings, for use in powering other circuits, for example the monitoring circuit. The power receiving transformer Tn also comprises intrinsically safe segregation, and may comprise further intrinsically safe or non-intrinsically safe windings, for use in powering other circuits, for example any associated non-intrinsically safe circuits.

Figure 26:
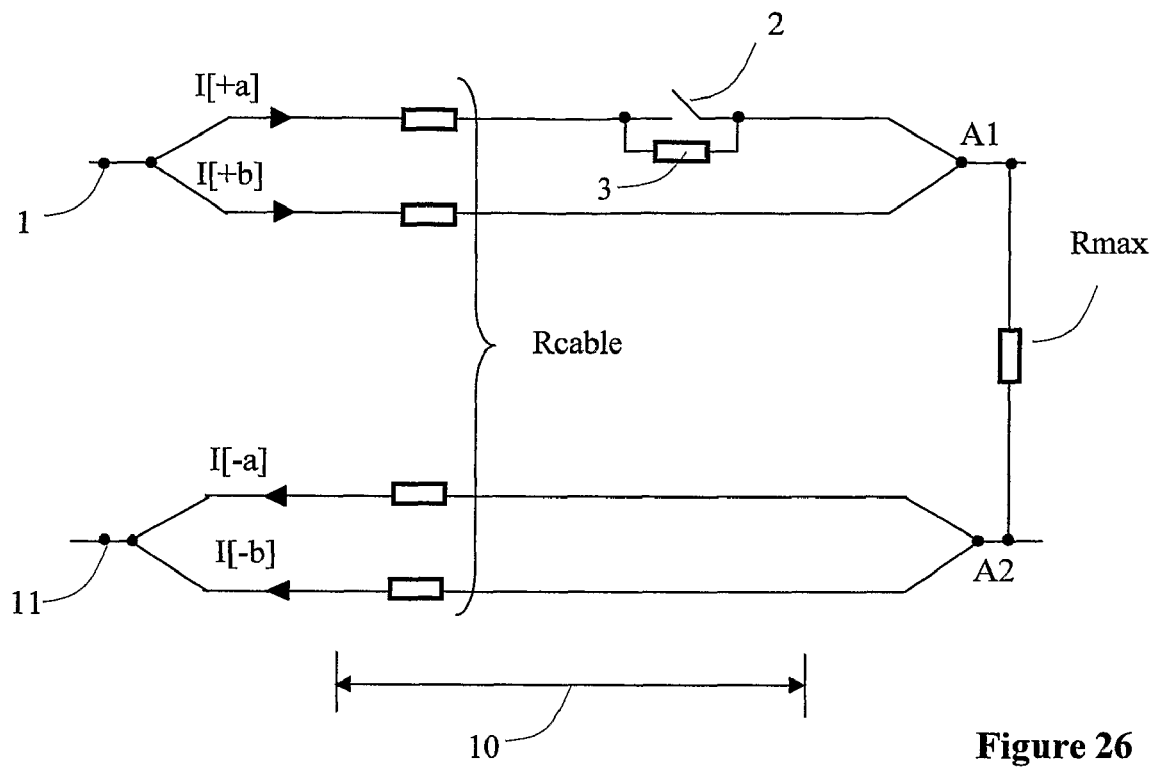
FIG. 26 is diagrammatic view of part of an electrical circuit according to the present invention.
Figure 27:
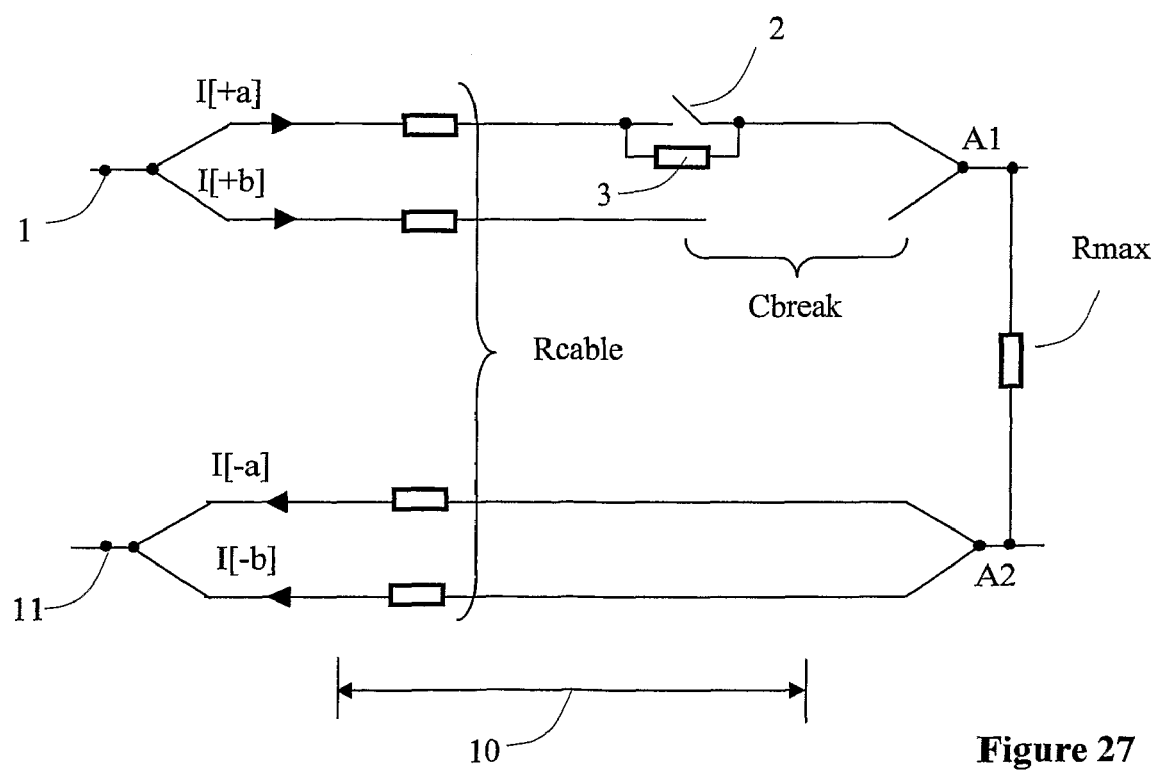
FIG. 27 is diagrammatic view of part of an electrical circuit according to the present invention.

As referred to above, cable breaks within multi-core cables are not considered to be instantaneous, and the idea that two arcs could develop simultaneously is never considered to be a possibility. It is however quite possible that one line could break or be disconnected, and with that one line already broken or disconnected a second could break or become disconnected. FIGS. 26 and 27 show electrical circuits in which this occurs.

In FIG. 26 an electrical circuit comprises a cable 10 with a load Rmax. The load Rmax is at an optimally high resistance so as not to provide a significant interruption reading, but is at an optimally low resistance within the normal incendive region at a given source voltage. The cable 10 has a resistance Rcabel, which may include any other upstream component resistance provided it is adequately balanced. A first break 2 in the cable, or a break with a propagating arc 3, shunts current I[+a] away from the interrupted line to the uninterrupted line, such that the current I[+b] increases. This prevents incendive current and/or incendive voltage through and/or across the arc, but it also increases the current in the uninterrupted line, rendering it potentially more dangerous were it to be subsequently broken. However, as described above, the differential change in the lines will be detected and the power supply will be isolated to both lines, solving the problem.

In FIG. 27 a separation Cbreak has occurred in one of the lines of an electrical circuit, and the full current is now carried by the remaining line. It is quite possible that a line could gradually reach this state without detection, by corrosion or a similar effect. However, from this point on a break 2 in the remaining line, with an arc 3 and a maximum resistance Rmax at a point of incendivity, would be detected by the above described monitoring and control means, and dealt with accordingly. Alternatively, the circuit could be arranged to measure the difference of current flowing between the two lines, for example with a bridge device. This would be more sensitive to any difference between the lines and would not be effected by high line currents.

In reality, a slow increase in resistance, within one line in the cable, must pass from a normal core resistance, to a high resistance or to an open circuit. Whilst passing, it would be likely, if this scenario is considered as likely, that it passes through a matched resistance which could generate heat that could be incendive. For example, a fifteen volt FISCO power supply may feed a cable that has a resistive transitional fault as described above, and if a short circuit is applied to the cable end the resistance could be incendive at anywhere from one hundred and twelve ohms to one hundred and eighty seven ohms. Furthermore, the load Rmax should comprise a minimum resistance so that the voltage across point A1-A2 is maintained. Alternatively the load Rmax resistance should be adequately increased if the voltage across A1-A2 falls. However, if Cbreak occurred the monitoring and control means would have reacted to it and isolated the power supply.

Figure 28:
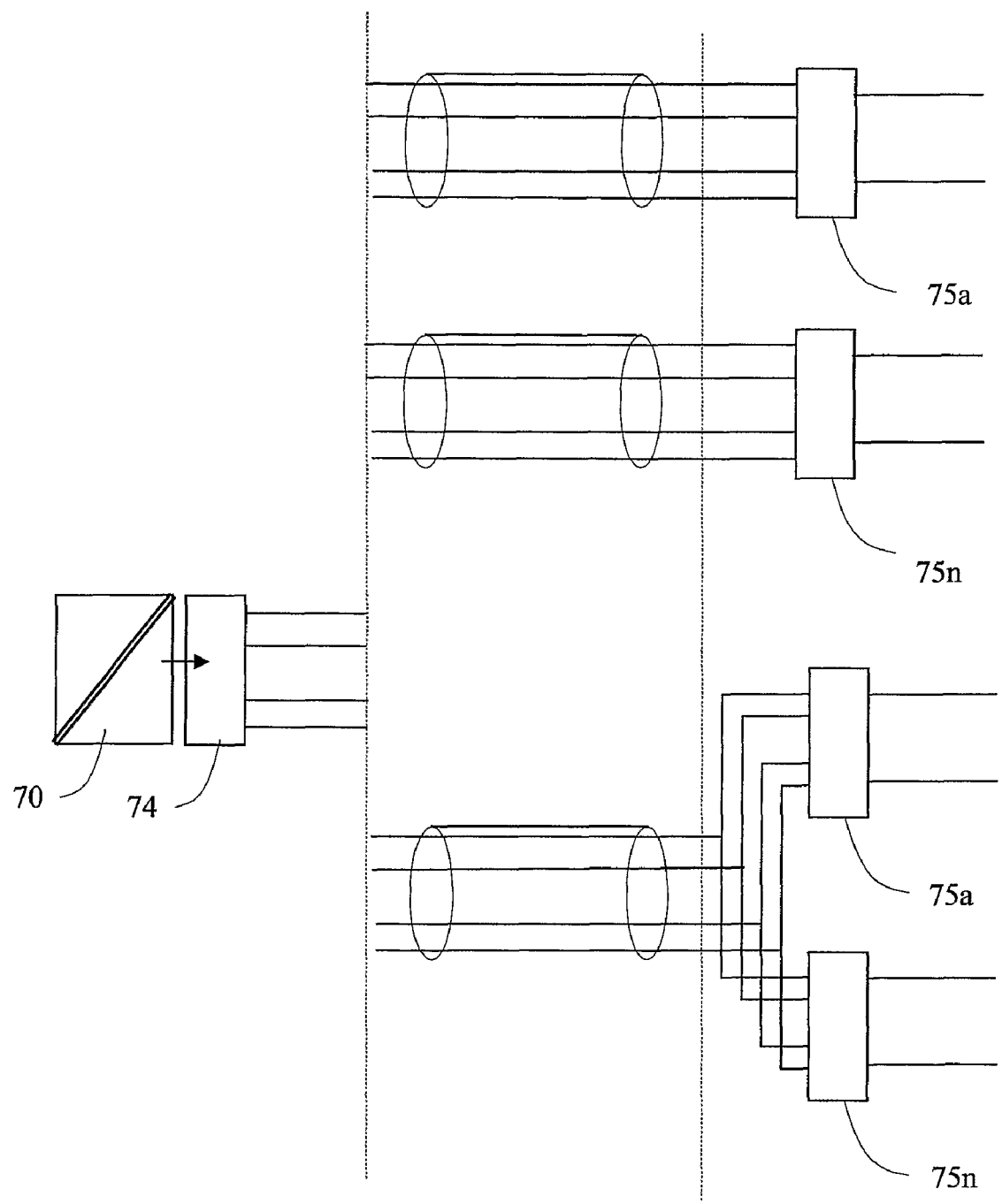
FIG. 28 is a diagrammatic view of two different arrangements of electrical circuit according to the present invention.

FIG. 28 illustrates two alternative advantageous circuit arrangements using any of the above described arrangements. FIG. 28 shows how an electrical circuit can utilise one cable to supply more than one load and fault system 75a to 75n, taking power from one power supply 70 with one discrete fault detection 74, or how it can utilise more than one cable to supply the same components. Of course, the one power supply 70 with one discrete fault detection 74 may be made redundant. This example illustrates how one power source can be used to supply many loads in a 'star' and/or 'bus' topology, with the option to 'multi-drop' several load systems using cable interconnections.

As referred to above, any of the above circuits can comprise one or more duplications to satisfy EN50020.

In addition, the load points A1-A2 can comprise any circuit, for example an encapsulated system [Ex e] or one which is further energy limited [Ex i]. The load may also comprise capacitive and/or inductive and/or constant current and/or resistive characteristics, or any other complex characteristics, provided they do not lead to an incendive situation. As such, adequate protection methods for each option must be provided. It may of course be adequate to rely on blocking diodes to provide this protection. Further intrinsically safe isolation may also be provided at the load to accommodate non-intrinsically safe circuits and so on.

For higher power circuits, it is possible to implement a hybrid solution comprising protected cable media which prevent crossing faults, so only break/make faults or arcs need by accounted for, which are easier to detect. This allows connectors to be used without concerning incendive connection/disconnection.

The above described embodiments can be altered without departing from the scope of claim 1. In particular, in one alternative construction, (not shown) an electrical circuit has a monitoring means comprising a power supply current monitoring component sited in the common negative or common positive line, and a further current monitoring component in one of the two negative lines and in one of the two positive lines. In this arrangement the monitoring is performed with a three component system in place of four. The current in one line of a balanced system will be one half of the power supply current, and any deviation from this ratio can be discerned, and will be indicative of a cable fault or propagating arc. Any load variation will still result in a discernable balanced ratio, and can be ignored.

The invention claimed is:

1. An electrical circuit comprising a power supply, a load, a first pair of parallel positive cables between the power supply and the load, a first pair of parallel negative cables between the load and the power supply, and incendive arc prevention means,
   in which the incendive arc prevention means comprises monitoring means adapted to monitor the first pair of positive cables and the first pair of negative cables, and to detect if the current and/or voltage in one of the first pair of positive cables deviates from the other of the first pair of positive cables, and if the current and/or voltage in one of the first pair of negative cables deviates from the other of the first pair of negative cables, and in which the incendive arc prevention means comprises a control means adapted to fully or partially isolate the power supply from the first pair of positive cables and the first pair of negative cables if the monitoring means detects that the current and/or voltage of one of the first pair of positive cables has deviated from the other of the first pair of positive cables, or if the current and/or voltage of one of the first pair of negative cables has deviated from the other of the first pair of negative cables.

2. An electrical circuit as claimed in claim 1 in which the monitoring means comprises an inductive reactor situated at a first end of each of the first pair of positive cables and a first end of each of the first pair of negative cables.

3. An electrical circuit as claimed in claim 2 in which the two inductive reactors at the first end of the first pair of positive cables share a first common core, and in which the two inductive reactors at the first end of the first pair of negative cables share a second common core.

4. An electrical circuit as claimed in claim 3 in which the monitoring means comprises a first sensor coil wound round the first common core and a second sensor coil wound round the second common core.

5. An electrical circuit as claimed in claim 4 in which the first sensor coil and the second sensor coil are fed to window comparators adapted to drive an isolation means adapted to fully or partially isolate the power supply from the first pair of positive cables and the first pair of negative cables if signals are received from the first sensor coil or the second sensor coil.

6. An electrical circuit as claimed in claim 5 in which the isolation means comprises a series element.

7. An electrical circuit as claimed in claim 5 in which the isolation means comprises a shunt element between the power supply and the first pair of positive cables and first pair of negative cables.

8. An electrical circuit as claimed in claim 6 or 7 in which an inductive reactor is situated at a second end of each of the first pair of positive cables and at a second end of each of the first pair of negative cables, and in which the two inductive reactors at the second end of the first pair of positive cables share a third common core, and in which the two inductive reactors at the second end of the first pair of negative cables share a fourth common core.

9. An electrical circuit as claimed in claim 8 in which the monitoring means further comprises a third sensor coil would round the third common sore and a fourth sensor coil would round the fourth common core.

10. An electrical circuit as claimed in claim 9 in which the third sensor coil and the fourth sensor coil are fed to window comparators adapted to drive an isolation means adapted to fully or partially isolate the load from the first pair of positive cables and the first pair of negative cables if signals are received from the third sensor coil or the fourth sensor coil.

11. An electrical circuit as claimed in claim 10 in which all the inductive reactors are provided with resistive shunts.

12. An electrical circuit as claimed in claim 1 in which monitoring means is adapted to separately monitor the current and/or voltage in both the positive cables and both the negative cables in order to discern if the current and/or the voltage of one of the first pair of positive cables, or one of the first pair of negative cables, deviates from the other.

13. An electrical circuit as claimed in claim 1 in which the electrical circuit comprises a common positive section between the power supply and the load, or a common negative section between the load and the power supply, in which the monitoring means is adapted to separately monitor the current and/or voltage in one of the positive cables, in one of the negative cables, and in the common positive section or the common negative section, whichever is provided, and in which the control means adapted to fully or partially isolate the power supply from the first pair of positive cables and the first pair of negative cables if the current and/or voltage in the one positive cable or the one negative cable deviates from substantially half the current and/or voltage in the common positive section or the common negative section, whichever is provided.

14. An electrical circuit as claimed in claim 12 or 13 in which the control means comprises a function circuit.

15. An electrical circuit as claimed in claim 14 in which each of the first pair of positive cables is provided with a diode at its load end, and in which each of the first pair of negative cables is provided with a diode at its load end.

16. An electrical circuit as claimed in claim 1 in which the control means is adapted to re-connect the power supply to the first pair of positive cables and the first pair of negative cables a pre-determined time after it has been isolated therefrom in use.

17. An electrical circuit as claimed in claim 1 in which the first pair of positive cables or the first pair of negative cables is provided with a connector at one end comprising two pins, one for each cable, and in which the two pins are different lengths.

18. An electrical circuit as claimed in claim 1 in which the electrical circuit comprises one or more second pairs of parallel positive cables between the power supply and the load and one or more second pairs of parallel negative cables between the load and the power supply,
  and in which the monitoring means is adapted to monitor the one or more second pairs of positive cables and the one or more second pairs of negative cables, and in each case to detect if the current and/or voltage in one of any of the pairs of cables deviates from the other.

19. An electrical circuit as claimed in claim 18 in which if the monitoring means detects that the current and/or voltage of one of any of the pairs of cables deviates from the other, the control means fully or partially isolates the power supply from that pair of cables and its corresponding opposite polarity pair of cables.

20. An electrical circuit as claimed in claim 19 in which if the monitoring means detects that the current and/or voltage of one of any of the pairs of cables deviates from the other, the control mean fully or partially isolates the power supply from all the cables.

21. An electrical circuit as claimed in claim 18 in which the electrical circuit is provided with a connector comprising pins from two or more positive cables and two or more negative cables, in which the pins from the two or more positive cables are grouped together, and in which the pins from the two or more negative cables are grouped together.

22. An electrical circuit as claimed in claim 1 in which the cables are configured as an Ethernet cable.

23. An electrical circuit comprising a power supply, a load, a first pair of parallel positive cables between the power supply and the load, a first pair of parallel negative cables between the load and the power supply, and incendive arc prevention means;
  in which the incendive arc prevention means comprises monitoring means adapted to monitor the first pair of positive cables and the first pair of negative cables, and to detect if the current and/or voltage in one of the first pair of positive cables deviates from the other, and if the current and/or voltage in one of the first pair of negative cables deviates from the other;
  and in which the incendive arc prevention means comprises a control means adapted to fully or partially isolate the power supply from the first pair of positive cables and the first pair of negative cables if the monitoring means detects that the current and/or voltage of one of the first pair of positive cables has deviated from the other, or if the current and/or voltage of one of the first pair of negative cables has deviated from the other;

wherein the monitoring means comprises an inductive reactor situated at a first end of each of the first pair of positive cables and a first end of each of the first pair of negative cables; and wherein an inductive reactor is situated at a second end of each of the first pair of positive cables and at a second end of each of the first pair of negative cables, and in which the two inductive reactors at the second end of the first pair of positive cables share a third common core, and in which the two inductive reactors at the second end of the first pair of negative cables share a fourth common core.

* * * * *